United States Patent [19]

Mikami et al.

[11] Patent Number: 5,350,445
[45] Date of Patent: Sep. 27, 1994

[54] HYDROPHILIC COATING COMPOSITION AND BATH CONTAINING SAME

[75] Inventors: Fujio Mikami, Kanagawa; Kiyotada Yasuhara, Yokohama; Masahiro Kojima; Susumu Inoue, both of Oyama, all of Japan

[73] Assignees: Nippon Paint Co., Ltd.; Showa Aluminum Corporation, both of Osaka, Japan

[21] Appl. No.: 896,978

[22] Filed: Jun. 11, 1992

[30] Foreign Application Priority Data

Jun. 12, 1991 [JP] Japan .................................. 3-167637
Apr. 24, 1992 [JP] Japan .................................. 4-131878

[51] Int. Cl.⁵ .............................................. C09D 5/08
[52] U.S. Cl. ................................. 106/14.41; 106/14.42; 106/14.43; 106/15.05; 106/18.32; 106/18.33; 106/18.34; 106/18.35; 548/543
[58] Field of Search ............... 106/14.41, 14.42, 14.43, 106/15.05, 18.32, 18.33, 18.34, 18.35; 252/394, 396, 393, 395; 548/543

[56] References Cited

U.S. PATENT DOCUMENTS

| | | | |
|---|---|---|---|
| 3,696,498 | 10/1972 | Leontaritis et al. | 427/156 |
| 3,896,753 | 7/1975 | Shepherd et al. | 106/194 |
| 3,990,381 | 11/1976 | Shepherd et al. | 106/15.08 |
| 4,425,465 | 1/1984 | Padget et al. | 106/18.11 |
| 4,989,607 | 2/1991 | Keusch et al. | 252/500 |

FOREIGN PATENT DOCUMENTS

| | | |
|---|---|---|
| 0125113 | 11/1984 | European Pat. Off. . |
| 60-145879 | 8/1985 | Japan . |
| 1240688 | 9/1989 | Japan . |
| 1299877 | 12/1989 | Japan . |
| 349944 | 3/1991 | Japan . |

OTHER PUBLICATIONS

Patent Abstracts of Japan, vol. 9, No. 311, Dec. 7, 1985.

*Primary Examiner*—Anthony Green
*Attorney, Agent, or Firm*—Sughrue, Mion, Zinn, Macpeak & Seas

[57] ABSTRACT

The hydrophilic coating composition including, on a solid basis, (a) 0.3-6 parts by weight of polyvinyl pyrrolidone having a polymerization degree of 10-1000; and (b) 1-10 parts by weight of polyvinyl alcohol having a saponification degree of 80% or more and a polymerization degree of 100-1000, a weight ratio of the component (a) to the component (b), (a)/[(a)+(b)], being in the range of 0.1-0.9.

50 Claims, No Drawings

HYDROPHILIC COATING COMPOSITION AND BATH CONTAINING SAME

BACKGROUND OF THE INVENTION

The present invention relates to a hydrophilic coating composition for aluminum members such as heat exchanger fins, etc., and a bath containing such a hydrophilic coating composition. More particularly, it relates to a hydrophilic coating composition for imparting a good corrosion resistance and a high hydrophilic nature to the aluminum members such as fins of heat exchangers while reducing unpleasant odor which are generated from the heat exchangers, and a bath containing such a hydrophilic coating composition.

Since aluminum and its alloys are light and have good workability and heat conductance, they are widely used for fins of heat exchangers. Recently more and more air conditioners have been used not only for cooling but also for warming and dehumidification. In heat exchanger parts of these air conditioners, aluminum alloy fins are generally used.

However, it is observed that moisture tends to be condensed and deposited as water droplets on the fin surfaces of air conditioners during cooling operations. If the fin surface is water-repellent, this condensed water tends to be deposited in a hemispherical form on the fin surface or forms bridges between the fins, preventing smooth air flow, which in turn increases resistance of air flow, thereby decreasing heat exchange efficiency.

In addition, although aluminum and its alloys are essentially excellent in corrosion resistance, it is likely that the condensed water remaining on the aluminum fin surfaces for a long period of time functions like an oxygen concentration cell, and that contaminants in the air are absorbed and concentrated in the condensed water. As a result, a hydration reaction and a corrosion reaction are accelerated. Those products produced by the corrosion are accumulated on the aluminum fin surfaces, which not only deteriorate heat exchange performance, but also are blown out of the air conditioners as white fine powders together with a hot air during the warming operation in the winter season. This also causes an unpleasant odor.

To solve these problems, various attempts have been made to form coatings for aluminum fin surfaces to improve their corrosion resistance and hydrophilic nature.

For instance, Japanese Patent Laid-Open No. 1-299877 discloses a surface treatment agent comprising fully-saponified polyvinyl alcohol, a water-soluble polyamide resin and a urea resin at a weight ratio of 1:0.5-2 0.01-0.5, and water. A bath containing 2-10 weight %, on a solid basis, of the surface treatment agent is used for surface treatment of the aluminum fins of heat exchangers.

Japanese Patent Laid-Open No. 1-240688 discloses an aluminum fin having a corrosion-resistant chemical primer coating and a hydrophilic coating comprising a benzimidazole compound.

Further, Japanese Patent Laid-Open No. 3-49944 discloses a heat exchanger made of aluminum and comprising (a) tubes made of aluminum through which a fluid flows, (b) fins made of aluminum and arranged between the tubes for accelerating heat exchange between the fluid and air, (c) a first protective chemical coating layer formed on the tubes, (d) a second protective layer formed on the first protective layer containing an antimicrobial agent such as 2,2-dithiobis(pyridine-1-oxide).

However, any one of the coatings disclosed in the above references fails to show a good hydrophilic nature and a sufficient effect in preventing unpleasant odor. The conventional surface treatment technologies for heat exchangers, etc. fail to provide coatings which have not only sufficient hydrophilic nature, corrosion resistance and strength but also excellent odor-preventing effect.

OBJECT AND SUMMARY OF THE INVENTION

An object of the present invention is, therefore, to provide a hydrophilic coating composition for forming hydrophilic coatings having excellent hydrophilic nature, corrosion resistance and water resistance with substantially no unpleasant odor, on heat exchanger fins, etc.

Another object of the present invention is to provide a hydrophilic coating bath containing such a hydrophilic coating composition.

As a result of intense research in view of the above objects, the inventors have found that a combination of polyvinyl pyrrolidone having a particular range of polymerization degree and polyvinyl alcohol having particular ranges of a saponification degree and a polymerization degree at a particular weight ratio can provide a coating having good hydrophilic nature and corrosion resistance with substantially reduced unpleasant odor. The present invention is based on this finding.

Thus, the hydrophilic coating composition according to the present invention comprises, on a solid basis, (a) 0.3-6 parts by weight of polyvinyl pyrrolidone having a polymerization degree of 10-1000; and (b) 1-10 parts by weight of polyvinyl alcohol having a saponification degree of 80% or more and a polymerization degree of 100-1000, a weight ratio of the component (a) to the component (b), (a)/[(a)+(b)], being in the range of 0.1-0.9.

The hydrophilic coating bath according to the present invention contains a hydrophilic coating composition in a concentration of 10-200 g/l, the hydrophilic coating composition comprising, on a solid basis, (a) 0.3-6 parts by weight of polyvinyl pyrrolidone having a polymerization degree of 10-1000; and (b) 1-10 parts by weight of polyvinyl alcohol having a saponification degree of 80% or more and a polymerization degree of 100-1000, a weight ratio of the component (a) to the component (b), (a)/[(a)+(b)], being in the range of 0.1-0.9.

DETAILED DESCRIPTION OF THE INVENTION

The present invention will be explained in detail below.

[1] Hydrophilic coating composition

The hydrophilic coating composition of the present invention comprises (a) polyvinyl pyrrolidone having a polymerization degree of 10-1000; and (b) polyvinyl alcohol having a saponification degree of 80% or more and a polymerization degree of 100-1000.

(a) Polyvinyl pyrrolidone

A typical example of the polyvinyl pyrrolidone used in the present invention is represented by the following formula:

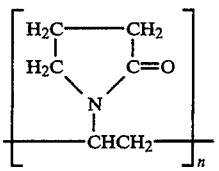

wherein n represents the polymerization degree.

The above polyvinyl pyrrolidone may be produced by polymerizing N-vinyl-2-pyrrolidone to a polymerization degree of 10–1000. When the polymerization degree of the polyvinyl pyrrolidone is smaller than 10, the resulting hydrophilic coating composition shows poor film-forming properties and poor unpleasant odor-suppressing effect, and its hydrophilic nature is rapidly deteriorated. Is the time passes. On the other hand, when the polymerization degree of the polyvinyl pyrrolidone exceeds 1000, good hydrophilic nature does not last long, and the unpleasant odor-suppressing effect is rather reduced. The polymerization degree "n" of the polyvinyl pyrrolidone is preferably 80–600, more preferably 100–360.

In order to provide the hydrophilic coating composition with good film-forming properties and long-lasting hydrophilic nature, the polyvinyl pyrrolidone should be contained in the hydrophilic coating composition in an amount of 0.3–6 parts by weight on a solid basis. When the amount of the polyvinyl pyrrolidone is smaller than 0.3 parts by weight, it fails to show a long-lasting hydrophilic nature. On the other hand, when the amount of the polyvinyl pyrrolidone exceeds 6 parts by weight, the film-forming property of the hydrophilic coating composition becomes poor and generates unpleasant odor. The amount of the polyvinyl pyrrolidone is preferably 0.5–5 parts by weight, more preferably 0.6–4 parts by weight.

In the present invention, it is preferable to combine two types of polyvinyl pyrrolidone; first one having a lower polymerization degree (hereinafter referred to as "low-polymerization degree polyvinyl. pyrrolidone"), and second one having a higher polymerization degree (hereinafter referred to as "high-polymerization degree polyvinyl pyrrolidone"). The low-polymerization degree polyvinyl pyrrolidone has a polymerization degree of 10–50, and the high-polymerization degree polyvinyl pyrrolidone has a polymerization degree of 100–500.

By combining the above two types of polyvinyl pyrrolidone, the resulting hydrophilic coating composition shows better film-forming property and longer-lasting hydrophilic nature. This mechanism is not necessarily clear, but it may be considered that when the two types of polyvinyl pyrrolidone having different polymerization degrees are used, the low-polymerization degree polyvinyl pyrrolidone is predominantly cross-linked in the process of a hardening reaction, thereby slowing the cross-linking of the high-polymerization degree polyvinyl pyrrolidone. As a result, a higher hydrophilic nature can be achieved. Unless the polymerization degrees of the two types of polyvinyl pyrrolidone are within the above ranges, either one of the film-forming property and the capability of showing a long-lasting hydrophilic nature would be poor.

The total amount of the low-polymerization degree polyvinyl pyrrolidone and the high-polymerization degree polyvinyl pyrrolidone is 0.3–6 parts by weight, preferably 0.6–4 parts by weight, on a solid basis. A weight ratio of the low-polymerization degree polyvinyl pyrrolidone to the high-polymerization degree polyvinyl pyrrolidone is 1/1.5–1/3.0. When the weight ratio of the high-polymerization degree polyvinyl pyrrolidone ( to the low-polymerization degree polyvinyl pyrrolidone) is lower than 1.5, the hydrophilic coating composition fails to have a long-lasting hydrophilic nature. On the other hand, when the weight ratio exceeds 3.0, the film-forming property of the hydrophilic coating composition becomes poor. The preferred weight ratio is ½–1/2.5. Further, three or more types of polyvinyl pyrrolidones having different polymerization degrees may be contained in the hydrophilic coating composition.

(b) Polyvinyl alcohol

A typical example of the polyvinyl alcohol used in the present invention may be expressed by the following formula:

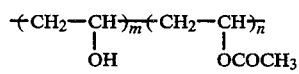

wherein m represents the number of saponified structure units, and n represents the number of unsaponified structure units.

The above polyvinyl alcohol should have a saponification degree of 80% or more, and a polymerization degree (m+n) of 100–1000. When the polyvinyl alcohol has a saponification degree lower than 80% or has a polymerization degree larger than 1000, it shows a poor hydrophilic nature. On the other hand, when it has a polymerization degree smaller than 100, it shows poor film-forming property and unpleasant odor-suppressing effect. The preferred saponification degree is 90% or more, and the preferred polymerization degree is 200–600. Incidentally, the saponification degree and the polymerization degree herein are measured according to JIS K6725 5.2 and JIS K6725 5.4, respectively.

The polyvinyl alcohol having a saponification degree of 80% or more and a polymerization degree of 100–1000 functions to suppress unpleasant odor and to improve a hydrophilic nature. To achieve these functions effectively, the amount of the polyvinyl alcohol should be 1–10 parts by weight on a solid basis. When the amount of the polyvinyl alcohol is smaller than 1 parts by weight, the hydrophilic coating composition shows poor film-forming property and unpleasant odor-suppressing effect. On the other hand, when it exceeds 10 parts by weight, the hydrophilic coating composition fails to have a long-lasting hydrophilic nature (determined by a contact angle of water) after it is dipped in a flowing water. The preferred amount of the polyvinyl alcohol is 2–7 parts by weight.

To provide a hydrophilic coating having an excellent hydrophilic nature without unpleasant odor, the amounts of the above components (a) and (b) in the hydrophilic coating composition are required to meet, in addition to the above-mentioned conditions, the following condition: A weight ratio of (a) polyvinyl pyrrolidone to (b) polyvinyl alcohol, (a)/[(a)+(b)], is in the range of 0.1–0.9 on a solid basis. When the ratio of (a)/[(a)+(b)] is less than 0.1, the hydrophilic nature is insufficient though the unpleasant odor-suppressing effect and film-forming property are sufficient. On the other hand, when it exceeds 0.9, the unpleasant odor-suppressing effects and the film-forming ability become poor. The preferred weight ratio of (a)/[(a)+(b)] is 0.2–0.8.

(c) Other components

The hydrophilic coating composition for forming a hydrophilic coating, according to the present invention may contain, in addition to the above indispensable components (a) and (b), water-soluble polyamides, other water-soluble resins than the water-soluble polyamides capable of functioning as cross-linking agents, surfactants, mildew-proofing agents, antiseptics (bactericides), water glass and/or colloidal silica in such amounts as not to generate unpleasant odor, small amounts of solvents, etc., if necessary.

(i) Water-soluble polyamides

The water-soluble polyamides usable in the present invention may be water-soluble nylons, for instance, nylon 6 modified to be soluble in water and/or alcohol. The average polymerization degree of the water-soluble nylons is in the range of 50–300, preferably 80–200. Such water-soluble nylons are commercially available, including, for example, AQ-nylon A-90, A-70, P-70, etc. (products of Toray Industries, Inc.).

The water-soluble nylon has a function to give good hydrophilic nature to the coating. To achieve this function effectively, the amount of the water-soluble nylon is preferably 0.3–5 parts by weight on a solid basis in the hydrophilic coating composition. When the amount of the water-soluble nylon is less than 0.3 parts by weight, the film-forming property is not sufficiently improved and the hydrophilic nature of the resulting coating does not last long. On the other hand, when it exceeds 5 parts by weight, the unpleasant odor-suppressing effects turn insufficient. The more preferred amount of the water-soluble nylon is 0.5–3.0 parts by weight.

The water-soluble nylon itself is water soluble and its hydrophilic groups remain intact even after the baking and drying of the coating, so that it does not lose hydrophilic nature. Such water-soluble nylon has at least one of a hydroxyl group, an amino group, secondary amines, tertiary amines and alkanol amines. As secondary amines, aliphatic amines such as ethylenediamine, trimethylenediamine, tetramethylenediamine, pentamethylenediamine (cadaverine), hexamethylenediamine, 1,7-diaminoheptane, 1,8-diaminooctane, 1,9-diaminononane, 1,10-diaminodecane, etc., and aromatic amines such as o-phenylenediamine, m-phenylenediamine, p-phenylenediamine, etc. may be used. As the tertiary amines, triethyl amine, tripropyl amine, tributyl amine, dimethylbenzyl amine, etc. may be used. As for alkanol amines, ethanol amine, diethanol amine, triethanol amine, amino ethyl ethanol amine, morpholine, etc., may be used.

(ii) Other water-soluble resins capable of functioning as cross-linking agents

The other water-soluble resins capable of functioning as cross-linking agents may be water-soluble amino resins and water-soluble phenol resins.

1. Water-soluble amino resins

The water-soluble amino resins usable in the present invention include melamine resins such as n-butylated melamine resins, iso-butylated, melamine resins, benzoguanamine resins, urea resins, etc., which are modified to have water solubility. These resins may usually be prepared by carrying out an addition reaction or an addition condensation reaction of amino resins such as melamines and benzoguanamine with aldehydes such as formaldehyde, para-formaldehyde, etc. and then subjecting the resulting compound to etherification with monovalent alcohols having 1–4 carbon atoms. An-tong the water-soluble amino resins mentioned above, the water-soluble melamines are preferable.

Specific examples of such melamine resins are alkoxymethyl melamines having alkoxy groups such as methoxy, ethoxy, n-butoxy, i-butoxy, etc., and methylated melamines are most preferable.

The water-soluble amino resin acts as a cross-linking agent to improve the film-forming property of the hydrophilic coating composition. To achieve this function effectively, the amount of the water-soluble amino resin is preferably 0.1–5 parts by weight on a solid basis in the hydrophilic coating composition. When the amount of the water-soluble amino resin is less than 0.1 parts by weight, the resulting hydrophilic coating composition is poor in film-forming property and unpleasant odor-suppressing effect. On the other hand, when the amount of the water-soluble amino resin is more than 5 parts by weight, the hydrophilic nature of the coating is poor. The more preferred amount of the water-soluble amino resin is 0.5–2 parts by weight.

Since the water-soluble amino resin itself is water soluble, and since its hydrophilic groups remain intact after baking and drying of the coating, it does not lose a hydrophilic nature, like the water-soluble nylon. Such a water-soluble amino resin has at least one of secondary amines, tertiary amines and alkanol amines, which are listed in (c) (i) above. The water-soluble amino resin may also have hydroxyl groups.

2. Water-soluble phenol resins

The water-soluble phenol resins usable in the present invention include polycondensates of compounds containing phenolic OH groups such as phenol, cresol, xylenol, p-alkyl phenol, p-phenyl phenol, chlorophenol, bisphenol A, phenol sulfonic acid, resorcinol, etc., and aldehydes such as formalin, furfural, etc., which polycondensates are then modified to have water solubility. These water-soluble phenol resins are generally exemplified as phenol-formalin resins, cresol-formalin resins, phenol-furfural resins, resorcinol resins, etc.

The water-soluble phenol resins form cross links between resin chains in the hydrophilic coating composition to increase its film-forming property. To achieve this function effectively, the amount of the water-soluble phenol resin is preferably 0.1–5 parts by weight on a solid basis. When the amount of the water-soluble phenol resin is smaller than 0.1 parts by weight, the resulting hydrophilic coating composition shows poor film-forming property and unpleasant odor-suppressing effect. On the other hand, when it exceeds 5 parts by weight, the hydrophilic coating composition shows a poor hydrophilic nature. The more preferred amount of the water-soluble phenol resin is 0.5–2 parts by weight.

(iii). Surfactants

The surfactants may be nonionic, cationic, anionic or ampholytic ones, and any suitable surfactants may be selected by taking into consideration the stability, foamability, coatability, etc. of the hydrophilic coating composition solution.

Typical examples of nonionic surfactants which may be used include polyoxyethylene glycol, polyoxypropylene glycol, polyoxyethylene-polyoxypropylene glycol, polyoxyethylene alkylphenyl ether, glycerin-aliphatic acid esters, sorbitan-aliphatic acid esters, pentaerythritol aliphatic acid esters, polyoxyethylene sorbitan aliphatic acid esters, polyoxyethylene alkyl ethers, etc.

Typical examples of anionic surfactants which may be used include dialkylsulfosuccinates, alkane sulfonates, alkylbenzene sulfonates, alkylnaphthalene sulfonates, polyoxyethylene alkyl sulfophenyl ether salts, alkyl phosphates, polyoxyethylene alkyl ether-phosphates, aliphatic alkyl ester-sulfates, alkyl sulfates, polyoxyethylene alkyl ether-sulfates, aliphatic acid monoglyceridesulfates, etc.

Typical examples of cationic surfactants which may be used include alkyl amine salts, dialkyl amine salts, etc.

Typical examples of ampholytic surfactants may be N,N,N-trialkyl-N-sulfo alkylene ammonium betaine, etc.

The amount of the surfactant added is preferably 1.5 parts by weight or less. When it exceeds 1.5 parts by weight, the water resistance of the resulting coating decreases.

As for the mildew-proofing agents and the antiseptics (bactericides), quaternary ammonium salts, nitrogen-containing sulfur compounds, halogen-containing nitrosulfur compounds, organic iodine compounds, benzimidazole and its derivatives, etc., may be used.

Mildew-proofing agents

Typical examples of the mildew-proofing agents include 2-thiazol-4-yl-benzimidazole, methylbenzimidazol-2-yl carbamate, N-dichlorofluoromethylthio-N',N'-dimethyl-N-phenylsulfamide, tetramethyl thiuram disulfide, N-(trichloromethylthio)-4-cyclohexene-1,2-dicarboxyimide, 2,4,5,6-tetrachloro-1,3-isophthalonitrile, 2,3,5,6-tetrachloro-4(methylsulfonyl) pyridine, bis(2-pyridylthio)-zinc-1,1 -dioxide, etc. Considering the heat resistance of the resulting hydrophilic coating, 2-thiazol-4-yl-benzimidazole, methylbenzimidazol-2-yl-carbamate, 2,4,5,6-tetrachloro-1,3-isophthalonitrile and bis(2-pyridylthio)-zinc-1,1-dioxide are preferable.

(v) Bactericides

Typical examples of the bactericides include 1,2-benzo isothiazoline-3-on (BIT), 2,3,5,6-tetrachloro-4-(methylsulfonyl) pyridine, 10,10'-oxybisphenoxyarsine, etc.

The preferable amount of the mildew-proofing agent and/or the bactericide is 0.1-2.0 parts by weight. The more preferred amount of the mildew-proofing agent and/or the bactericide is 0.2-1.0 parts by weight.

(vi) Water glass and/or colloidal silica

The addition of water glass and/or colloidal silica to the hydrophilic coating composition in such amounts as not to generate unpleasant odor may further improve the hydrophilic nature. As the water glass, $SiO_2/M_2O$ (where M represents Li, Na and K) may be used, arid $SiO_2/K_2O$ is particularly preferable. Colloidal silica having an average particle diameter of 10–50 $\mu$-m is preferable. Their total amount is preferably less than 1 part by weight.

(vii) Solvents

Further, solvents may be added to the hydrophilic coating composition for the improvement of the wettability of the resulting hydrophilic coating. Such solvents include alcohols and cellosolves. Their amounts are preferably less than 7 parts by weight.

[2] Hydrophilic coating bath

The hydrophilic coating bath for forming hydrophilic coatings on aluminum members according to the present invention is produced by properly diluting or dispersing the above hydrophilic coating composition with water to form an aqueous solution or dispersion. The percentages of the components in the bath are not different from those its described above. The concentration of the hydrophilic coating composition in the bath is usually adjusted so its to provide a hydrophilic coating of 0.5–2.5 $g/m^2$ to an aluminum surface by dipping, spraying, brushing, etc. The concentration of solid components in the bath may generally be 10–200 g/l, preferably 30–100 g/l. If some of the components decrease unproportionally, they should be supplemented in order to maintain the percentage of each component at a proper level.

[3] Surface treatment method

Before forming it coating layer with the hydrophilic coating bath, a degreasing treatment is usually conducted on an aluminum member. The degreasing treatment includes an acid-washing treatment using sulfuric acid, nitric acid, etc; solvent degreasing using trichloroethylene, perchloroethylene, gasoline, n-hexane, etc., and alkali degreasing using alkali solutions of sodium hydroxide, sodium carbonate, sodium silicate, sodium phosphate, etc.

After degreasing, a chemical treatment is conducted to form a corrosion-resistant layer on a degreased aluminum member. The corrosion-resistant layer can be obtained by a chromate treatment. The chromate treatment is conducted with a treatment liquid containing chromic acid and sulfuric acid, nitric acid, fluoric acid, phosphoric acid, etc. and proper additives.

The chromate treatment is categorized into two groups; a phosphoric chromate treatment using phosphoric acid as an inorganic acid, and a chromium chromate treatment using the other acids. From the viewpoint of corrosion resistance, the latter is better. The chromate treatment can be conducted by immersion in a treatment liquid, or spraying the treatment liquid. However, to fit exchanger's fins having complicated shapes, an immersion method is easier. The corrosion-resistant layer obtained by the chromate treatment has a Cr content of 30–250 $mg/m^2$. When it is less than 30 $mg/m^2$, the layer does not have sufficient corrosion resistance. On the other hand, when it exceeds 250 $mg/m^2$, its reaction with the hydrophilic layer takes place, resulting in the deterioration of its hydrophilic nature. The aluminum member formed with the corrosion-resistant layer is then washed with water. This is preferably done by dipping in a flowing water for about 10 seconds to 10 minutes.

The hydrophilic coating composition of the present invention is diluted or dispersed properly as an aqueous solution or dispersion, and applied to the aluminum surface already subjected to degreasing and the above chemical treatment. This can be done by any coating method such as a roll-coating method, a bar-coating method, an immersion method, a spraying method, a brushing method, etc. In a case where a treated aluminum member has a complicated shape like heat exchanger fins, the immersion method is preferable.

Incidentally, the hydrophilic coating bath of the present invention may be applied not only to shaped aluminum members such as fins but also to aluminum plates which are to be shaped after coating.

Each of the aluminum plates was then dipped in a bath having the composition shown in Table 1 for 1 minute at a room temperature, and then dried at 180° C. for 20 minutes to form a hydrophilic coating.

TABLE 1

| | Example No. | | | | | | | | |
|---|---|---|---|---|---|---|---|---|---|
| | 1 | 2 | 3 | 4 | 5 | 6 | 7 | 8 | 9 |
| Component (a)[1] | | | | | | | | | |
| Polymerization degree | 360 | 360 | 360 | 360 | 360 | 360 | 108 | 360 | 360 |
| Weight % | 3 | 3 | 3 | 3 | 3 | 1 | 3 | 3 | 3 |
| Component (b)[2] | | | | | | | | | |
| Saponification Degree | 90% | 90% | 90% | 90% | 90% | 90% | 90% | 90% | 90% |
| Polymerization Degree | 500 | 500 | 500 | 500 | 500 | 500 | 500 | 500 | 500 |
| Weight % | 5 | 5 | 5 | 5 | 5 | 10 | 5 | 5 | 5 |
| Water-soluble Nylon[3] | | | | | | | | | |
| Weight % | — | 1.5 | — | — | — | — | — | 1.5 | 1.5 |
| Other Water-soluble Resin[4] | | | | | | | | | |
| Type | — | — | M | U | Ph | M | — | Ph | Ph |
| Weight % | — | — | 1.0 | 1.0 | 1.0 | 1.0 | — | 1.0 | 1.0 |
| MP (wt %)[5] | — | — | — | — | — | — | — | — | 0.3 |
| Bactericide (wt %)[6] | — | — | — | — | — | — | — | — | 0.1 |
| (a)/[(a) + (b)] | 0.38 | 0.38 | 0.38 | 0.38 | 0.38 | 0.1 | 0.38 | 0.38 | 0.38 |

| | Comparative Example No. | | | | | | | | | |
|---|---|---|---|---|---|---|---|---|---|---|
| | 1 | 2 | 3 | 4 | 5 | 6 | 7 | 8 | 9 | 10 |
| Component (a)[1] | | | | | | | | | | |
| Polymerization degree | 360 | — | 360 | 360 | 360 | 26 | 6000 | 360 | 360 | 360 |
| Weight % | 3 | — | 7.1 | 0.05 | 6.5 | 3 | 3 | 3 | 3 | 7.1 |
| Component (b)[2] | | | | | | | | | | |
| Saponification Degree | — | 90% | 90% | 90% | 90% | 90% | 90% | 30% | 60% | 90% |
| Polymerization degree | — | 500 | 500 | 500 | 500 | 500 | 500 | 500 | 200 | 500 |
| Weight % | — | 10 | 0.6 | 11 | 1.2 | 5 | 5 | 5 | 5 | 0.6 |
| Water-soluble Nylon[3] | | | | | | | | | | |
| Weight % | — | — | — | — | — | — | — | — | — | 1.5 |
| Other Water-soluble Resin[4] | | | | | | | | | | |
| Type | — | — | — | — | M | — | — | — | — | Ph |
| Weight % | — | — | — | — | 1.0 | — | — | — | — | 1.0 |
| MP (wt %)[5] | — | — | — | — | — | — | — | — | — | — |
| Bactericide (wt %)[6] | — | — | — | — | 0.1 | — | — | — | — | — |
| (a)/[(a) + (b)] | 1.0 | 0 | 0.92 | 0.01 | 0.84 | 0.38 | 0.38 | 0.38 | 0.38 | 0.92 |

Note:
[1]Polyvinyl pyrrolidone manufactured by BASF having the following polymerization degree:
Polymerization degree 26: Rubiskol K-12
Polymerization degree 108: Rubiskol K-17
Polymerization degree 360: Rubiskol K-30
Polymerization degree 6000: Rubiskol K-90
[2]Polyvinyl alcohol manufactured by Shin-Etsu Chemical Co., Ltd. having the following properties:

| Saponification Degree | Polymerization Degree | |
|---|---|---|
| 90 | 500: | SMR-30HH |
| 60 | 200: | SMR-10M |
| 30 | 500: | SMR-20L |

[3]AQ Nylon P-70 having average polymerization degree of about 100 (manufactured by Toray Industries, Inc.).
[4]M: Water-soluble methylmelamine (NIKALAC MX-054 manufactured by Sanwa Chemical Co., Ltd.).
U: Water-soluble urea resin (EIBOND UL-3201S manufactured by Gun-Ei Chemical Industries, Ltd.).
Ph: Water-soluble phenol resin (HITANOL 4500 manufactured by Hitachi Chemical Co., Ltd.).
[5]Mildew-proofing agent (COATCIDE 55D manufactured by Takeda Chemical Industries. Ltd.).
[6]SLAOFF 72N manufactured by Takeda Chemical Industries, Ltd.
[7]Weight ratio of polyvinyl pyrrolidone (a) to [polyvinyl pyrrolidone (a) + polyvinyl alcohol (b)].

The present invention will be explained in further detail by way of the following Examples without intention of restricting the scope of the claims.

EXAMPLES 1-9, COMPARATIVE EXAMPLES 1-10

Aluminum plates were degreased and then subjected to a phosphoric chromate treatment by an immersion method with Alsurf 407/47 (tradename, manufactured by Nippon Paint Co., Ltd.) to form a corrosion-resistant coating having 80-120 mg/m² of Cr content. These chromate-treated aluminum plates were washed with tap water for 20 seconds.

Each of the resulting hydrophilic coatings was tested with respect to odor, hydrophilic nature (contact angle of water), water dissolution resistance, adhesion and mildew-proofing. The test procedures and the evaluation standards of test results were as follows:

(1) Odor test

Each aluminum plate formed with a hydrophilic coating (hereinafter referred to simply as "sample") was subjected to an odor test by direct smelling and evaluated as follows:
⊚: No odor;
○: Only slight odor;

Δ: Medium odor; and
X: Strong odor.

(2) Test of hydrophilic nature (Test of contact angle of water)

Each sample was dipped in water flowing from the tap at a flow rate of 5 liter per minute for 480 hours and then dried at 80° C. for 10 minutes. Each of the resulting hydrophilic coatings was measured with respect to a contact angle Q of 5μl of pure water droplet dropped onto each sample positioned horizontally by a goniometer (CA-Z of Kyowa Kaimen Kagaku K. K.). The contact angle Q was classified into the following categories:

⊚: $Q<20°$;
○: $20°<Q<30°$;
Δ: $30°<Q<40°$; and
X: $40°<Q$.

(3) Water dissolution resistance

Each sample was dipped in tap water for 24 hours, and the weight of the coating was measured before and after dipping to determine a water dissolution ratio (R) by the following equation:

R (%)=[(Initial coating weight—Coating weight after 24-hour dipping)—Initial coating weight]×100

The evaluation standards of water dissolution resistance were as follows:

⊚: $R<10\%$;
○: $10\%<R<30\%$;
Δ: $30\%<R\ 21\ 50\%$; and
X: $50\%<R$.

(4) Adhesion Test

Cross-cut test was performed on each sample by the following procedure: Straight cut lines perpendicular to each other were formed on each sample with an interval of 1 mm to have 100 square cut pieces. An adhesive tape was slicked to the cross-cut surface of each sample and then peeled off. The number of the square pieces of the coating which remained on the aluminum member was counted and classified as follows:

⊚: 100;
○: 99–90;
Δ: 89–80;
X: 79–70; and
XX: <70.

(5) Mildew-proofing test

According to JIS Z 2911, each sample of 3 cm×3 cm was immersed in flowing water for 250 hours, and then a suspension containing four kinds of spores shown below was sprayed to the sample. The sample was kept for incubation at 27° C. for 7 days. After the incubation, the propagation of the fungi on the sample was observed and classified into the following categories:

Fungus:

Aspergillus niger IFO 4414
Penicillium funiclosum IFO 6345
Cladosporium cladosporioides IFO 6348
Aureobasidium pullulans IFO 6353

Categories:

⊚: No propagation of the fungi observed by the naked eye.
○: Slight propagation of the fungi observed by the naked eye.
Δ: Fungi observed by the naked eye covers about ⅓ of the surface of the sample.
X: The fungi observed by the naked eye covers about ⅔ of the surface of the sample.
XX: The fungi observed by the naked eye covers substantially the entire surface of the sample.

The results of the tests (1)–(5) are shown in Table 2 below.

TABLE 2

| No. | Un-pleasant Odor | Hydro-philic Nature | Water Dissolution Resistance | Ad-hesion | Mildew-Proof |
|---|---|---|---|---|---|
| Example 1 | ⊚ | ⊚ | ○ | ⊚ | — |
| Example 2 | ⊚ | ○ | ○ | ⊚ | — |
| Example 3 | ○ | ⊚ | ⊚ | ⊚ | — |
| Example 4 | ○ | ⊚ | ⊚ | ⊚ | — |
| Example 5 | ⊚ | ⊚ | ⊚ | ⊚ | — |
| Example 6 | ○ | ○ | ○ | ⊚ | — |
| Example 7 | ⊚ | ⊚ | ○ | ⊚ | — |
| Example 8 | ⊚ | ⊚ | ⊚ | ⊚ | — |
| Example 9 | ⊚ | ⊚ | ⊚ | ⊚ | ⊚ |
| Com. Ex. 1 | ○ | Δ | Δ | X | — |
| Com. Ex. 2 | ○ | X | X | X | — |
| Com. Ex. 3 | ○ | Δ | Δ | X | — |
| Com. Ex. 4 | ○ | X | X | X | — |
| Com. Ex. 5 | ○ | Δ | ⊚ | ⊚ | Δ |
| Com. Ex. 6 | ○ | ⊚ | Δ | ○ | — |
| Com. Ex. 7 | Δ | ○ | ○ | ○ | — |
| Com. Ex. 8 | ⊚ | ○ | Δ | ○ | — |
| Com. Ex. 9 | ⊚ | ○ | X | ○ | — |
| Com. Ex. 10 | Δ | ⊚ | ⊚ | ⊚ | — |

EXAMPLES 10–14

Aluminum plates were degreased and then subjected to a phosphoric chromate treatment by an immersion method with Alsurf 407/47 (tradename, manufactured by Nippon Paint Co., Ltd.) to form a corrosion-resistant coating having 80–120 mg/m² of Cr content. These chromate-treated aluminum plates were washed with tap water for 20 seconds.

A hydrophilic coating composition shown in Table 3 was prepared, and it was diluted with water to prepare a bath having a solid concentration of 5 weight %. Each of the aluminum plates was then dipped in the bath for 1 minute at a room temperature, and then dried at 180° for 20 minutes to form a hydrophilic coating.

TABLE 3

| | Example No. | | | | |
|---|---|---|---|---|---|
| | 10 | 11 | 12 | 13 | 14 |
| Component (a)[1] | | | | | |
| Polymerization degree (low/high)[2] | 26/108 | 26/108 | 26/108 | 26/108 | 26/108 |
| Pbw (low/high)[3] | 10/20 | 13/27 | 8/17 | 6/14 | 13/27 |
| Wt. Ratio (low/high)[4] | 1/2 | 1/2.1 | 1/2.1 | 1/2.3 | 1/2.1 |
| Component (b)[5] | | | | | |

TABLE 3-continued

|  | Example No. | | | | |
| --- | --- | --- | --- | --- | --- |
|  | 10 | 11 | 12 | 13 | 14 |
| Saponification Degree | 98% | 98% | 98% | 98% | 98% |
| Polymerization degree | 230 | 230 | 230 | 230 | 230 |
| Parts by weight | 50 | 40 | 60 | 50 | 40 |
| Water-soluble Nylon[6] | 15 | 15 | 10 | 20 | 15 |
| Water-soluble Phenol[7] | 5 | 5 | 5 | 10 | 5 |
| Polyoxyethylene Glycol[8] | 5 | 5 | 5 | 5 | 5 |
| Mildew-proofing agent[9] | 10 | 10 | 10 | 10 | 10 |
| (a)/[(a) + (b)] | 0.38 | 0.5 | 0.29 | 0.29 | 0.5 |

Note:
[1]Polyvinyl pyrrolidone manufactured by BASF having the following polymerization degree:
Polymerization degree 26: Rubiskol K-12
Polymerization degree 108: Rubiskol K-17
[2]High: Showing the polymerization degree of high-polymerization degree polyvinyl pyrrolidone.
Low: Showing the polymerization degree of low-polymerization degree polyvinyl pyrrolidone.
[3]Amounts of the low-polymerization degree polyvinyl pyrrolidone and the high-polymerization degree polyvinyl pyrrolidone expressed by "parts by weight."
[4]Weight ratio of the low-polymerization degree polyvinyl pyrrolidone to the high-polymerization degree polyvinyl pyrrolidone.
[5]Polyvinyl alcohol having a saponification degree of 98% and a polymerization degree of 230 (SMR-10HH, manufactured by Shin-Etsu Chemical Co., Ltd.).
[6]AQ Nylon A-90 having average polymerization degree of about 100 (manufactured by Toray Industries, Inc.). Unit: Parts by weight.
[7]Water-soluble phenol resin (HITANOL 4500 manufactured by Hitachi Chemical Co., Ltd.). Unit: Parts by weight.
[8]Nonionic surfactant. Unit: Parts by weight per 100 parts by weight of solid components (components (a), (b), water-soluble nylon and water-soluble phenol).
[9]Bis(2-pyridylthio)-zinc-1,1-dioxide. Unit: Parts by weight per 100 parts by weight of the above-described solid components.

Each of the resulting hydrophilic coatings was tested with respect to odor, hydrophilic nature (contact angle of water), water dissolution resistance, adhesion and mildew-proofing in the same manner as in Example 1. The results are shown in Table 4.

TABLE 4

| No. | Unpleasant Odor | Hydrophilic Nature | Water Dissolution Resistance | Adhesion | Mildew Proof |
| --- | --- | --- | --- | --- | --- |
| Example 10 | ⊙ | ⊙ | ⊙ | ⊙ | ⊙ |
| Example 11 | ⊙ | ⊙ | ⊙ | ⊙ | ⊙ |
| Example 12 | ⊙ | ⊙ | ⊙ | ⊙ | ⊙ |
| Example 13 | ⊙ | ⊙ | ⊙ | ⊙ | ⊙ |
| Example 14 | ⊙ | ⊙ | ⊙ | ⊙ | ⊙ |

The present invention has been described by Examples, but it should be noted that any modifications are possible unless they deviate from the scope of the present invention defined by the claims attached hereto.

As described above in detail, the hydrophilic coatings formed from the hydrophilic coating composition according to the present invention have not only excellent hydrophilic nature and water dissolution resistance, but also their unpleasant odor is extremely reduced. They are also excellent in adhesion to aluminum members and in mildew proof. Particularly when two types of polyvinyl pyrrolidone having different polymerization degrees are used, further improvement in hydrophilic nature, water dissolution resistance and odor-suppressing effect can be achieved.

Thus, the hydrophilic coating composition according to the present invention is highly suitable for the hydrophilic surface treatment of aluminum members such as fins of heat exchangers.

What is claimed is:

1. A hydrophilic coating composition comprising: by weight in an aqueous solution or dispersion,
   (a) 0.3-6 parts by weight of polyvinyl pyrrolidone having a polymerization degree of 10-1000; and
   (b) 1-10 parts by weight of polyvinyl alcohol having a saponification degree of 80% or more and a polymerization degree of 100-1000, a weight ratio of said component (a) to said component (b), (a)/[(a)+(b)], being in the range of 0.1-0.9.

2. The hydrophilic coating composition according to claim 1, further containing 0.3-5 parts by weight of a water-soluble nylon.

3. The hydrophilic coating composition according to claim 1, further containing 0.1-5 parts by weight of a water-soluble phenol resin.

4. The hydrophilic coating composition according to claim 1, further containing 0.1-2 parts by weight of a mildew-proofing agent containing an imidazole compound.

5. The hydrophilic coating composition according to claim 1, wherein said polyvinyl pyrrolidone consists of a first and second pyrrolidone the first pyrrolidone has a polymerization degree of 10-50 and the second pyrrolidone has a polymerization degree of 100-500, and a weight ratio of the first polyvinyl pyrrolidone to the second polyvinyl pyrrolidone is 1/1.5-1/3.0.

6. The hydrophilic coating composition according to claim 1, wherein said polyvinyl pyrrolidone has a polymerization degree of 80-600.

7. The hydrophilic coating composition according to claim 6, wherein said polyvinyl pyrrolidone has a polymerization degree of 100-360.

8. The hydrophilic coating composition according to claim 1, wherein the amount of said polyvinyl pyrrolidone is 0.5-5 parts by weight on a solid basis.

9. The hydrophilic coating composition according to claim 8, wherein the amount of said polyvinyl pyrrolidone is 0.6-4 parts by weight on a solid basis.

10. The hydrophilic coating composition according to claim 1, wherein said polyvinyl alcohol has a saponification degree of 90% or more.

11. A hydrophilic coating bath containing a hydrophilic coating composition in a concentration of 10-200 g/l, said hydrophilic coating composition comprising, by weight in an aqueous solution or dispersion,
(a) 0.3-6 parts by weight of polyvinyl pyrrolidone having a polymerization degree of 10-1000; and
(b) 1-10 parts by weight of polyvinyl alcohol having a saponification degree of 80% or more and a polymerization degree of 100-1000, a weight ratio of said component (a) to said component (b), (a)/[(a)+(b)], being in the range of 0.1-0.9.

12. The hydrophilic coating composition according to claim 5, wherein the weight ratio is ½-1/2.5.

13. The hydrophilic coating composition according to claim 1, wherein said polyvinyl pyrrolidone consists of three or more polyvinyl pyrrolidones having different polymerization degrees.

14. The hydrophilic coating composition according to claim 1, wherein said polyvinyl alcohol has a polymerization degree of 200 to 600.

15. The hydrophilic coating composition according to claim 1, wherein said polyvinyl alcohol has a saponification degree of 90% or more.

16. The hydrophilic coating composition according to claim 1, wherein the amount of said polyvinyl alcohol is 2 to 7 parts by weight on a solid basis.

17. The hydrophilic coating composition according to claim 1, wherein said polyvinyl pyrrolidone has a polymerization degree of 80 to 600.

18. The hydrophilic coating composition according to claim 17, wherein the polymerization degree is 100-360.

19. The hydrophilic coating composition according to claim 1, wherein (a)/[(a)+(b)] is 0.2 to 0.8.

20. The hydrophilic coating composition according to claim 2, wherein the water-soluble nylon has an average polymerization degree in the range of 50 to 300.

21. The hydrophilic coating composition according to claim 1, wherein said polyvinyl pyrrolidone is present in an amount of 0.5 to 5 parts by weight.

22. The hydrophilic coating composition according to claim 21, wherein said polyvinyl pyrrolidone is present in an amount of 0.6 to 4 parts by weight.

23. The hydrophilic coating composition according to claim 20, wherein the average polymerization degree is in the range of 80 to 200.

24. The hydrophilic coating composition according to claim 2, wherein said water-soluble nylon is present in an amount of 0.5 to 3.0 parts by weight on a solid basis.

25. The hydrophilic coating composition according to claim 2, wherein the water-soluble nylon contains at least one of a hydroxyl group, an amino group, a secondary amine, a tertiary amine and an alkanol amine.

26. The hydrophilic coating composition according to claim 25, wherein the secondary amine is selected from the group consisting of aliphatic amines and aromatic amines.

27. The hydrophilic coating composition according to claim 26, wherein the aliphatic amines are selected from the group consisting of ethylenediamine, trimethylenediamine, tetramethylenediamine, pentamethylenediamine, hexamethylenediamine, 1,7-diaminoheptane, 1,8-diaminooctane, 1,9-diaminononene and 1,10-diaminodecane.

28. The hydrophilic coating composition according to claim 26, wherein the aromatic amine is selected from the group consisting of o-phenylenediamine-, m-phenylenediamine- and p-phenylenediamine.

29. The hydrophilic coating composition according to claim 25, wherein the tertiary amine is selected from the group consisting of triethylamine, tripropylamine, tributylamine and dimethylbenzylamine.

30. The hydrophilic coating composition according to claim 25, wherein the alkanol amine is selected from the group consisting of ethanolamine, diethanolamine, triethanolamine, aminoethylethanolamine and morpholine.

31. The hydrophilic coating composition according to claim 1, further containing a water-soluble amino resin in an amount of 0.1 to 5 parts by weight on a solid basis.

32. The hydrophilic coating composition according to claim 31, wherein the water-soluble amino resin is selected from the group consisting of melamine resins, iso-butylated melamine resins, benzoguanamine resins and urea resins, which are modified to have water-solubility.

33. The hydrophilic coating composition according to claim 32, wherein the melamine resins are alkoxymethylmelamines.

34. The hydrophilic coating composition according to claim 31, wherein said water-soluble amino resin is present in an amount of 0.5 to 2 parts by weight on a solid basis.

35. The hydrophilic coating composition according to claim 3, wherein the water-soluble phenol resin is selected from the group consisting of polycondensates of compounds containing phenolic hydroxy groups and aldehydes, which are modified to have water solubility.

36. The hydrophilic coating composition according to claim 35, wherein the polycondensates are selected from the group consisting of phenol, cresol, xylenol, p-alkylphenol, p-phenylphenol, chlorophenol, bisphenol A, phenol sulfonic acid and resorcinol.

37. The hydrophilic coating composition according to claim 35, wherein the aldehydes are selected from the group consisting of formalin and furfural.

38. The hydrophilic coating composition according to claim 36, wherein the water-soluble phenol resin is selected from the group consisting of phenol-formalin resins, cresol-formalin resins, phenol-furfural resins and resorcinol resins.

39. The hydrophilic coating composition according to claim 3, wherein said water-soluble phenol resin in present in an amount of 0.5 to 2 parts by weight on a solid basis.

40. The hydrophilic coating composition according to claim 1, further containing a surfactant in an amount of 1.5 parts by weight or less.

41. The hydrophilic coating composition according to claim 4, wherein said mildew-proofing agent is present in an amount of 0.2 to 1.0 parts by weight.

42. The hydrophilic coating composition according to claim 1, further containing a bactericide in an amount of 0.1 to 2 pats by weight.

43. The hydrophilic coating composition according to claim 42, wherein the bactericide is selected from the group consisting of 1,2-benzoisothiazoline-3-on, 2,3,5,6-tetrachloro-4-(methylsulfonyl)pyrridine and 10,10′-oxybisphenoxyarsine.

44. The hydrophilic coating composition according to claim 1, further containing at least one of water glass and colloidal silica in an amount sufficient to improve the hydrophilic nature of the hydrophilic coating composition without generating unpleasant odor.

45. The hydrophilic coating composition according to claim 44, wherein the water glass is selected from the group consisting of $SiO_2/M_2O$ and $SiO_2/K_2O$.

46. The hydrophilic coating composition according to claim 44, wherein the colloidal silica has an average particle diameter of 10 to 50 $\mu$m.

47. The hydrophilic coating composition according to claim 44, wherein the at least one of water glass and colloidal silica is present in an amount of less than 1 part by weight.

48. The hydrophilic coating composition according to claim 1, further containing a solvent in an amount of less than 7 parts by weight.

49. The hydrophilic coating composition according to claim 48, wherein the solvent is selected from the group consisting of alcohols and cellosolves.

50. The hydrophilic coating bath according to claim 11, wherein the hydrophilic coating composition is present in a concentration of 30 to 100 g/l.

* * * * *